United States Patent
Sim et al.

(10) Patent No.: US 7,031,756 B1
(45) Date of Patent: Apr. 18, 2006

(54) METHOD OF PROCESSING USER INFORMATION INPUTTED THROUGH TOUCH SCREEN PANEL OF DIGITAL MOBILE STATION

(75) Inventors: Seng-Wook Sim, Suwon-shi (KR); Yong-Jin Lee, Seoul (KR)

(73) Assignee: Samsung Electronics Co., LTD, Suwon-Si (KR)

( * ) Notice: Subject to any disclaimer, the term of this patent is extended or adjusted under 35 U.S.C. 154(b) by 88 days.

(21) Appl. No.: 09/531,657

(22) Filed: Mar. 20, 2000

(30) Foreign Application Priority Data

Mar. 18, 1999 (KR) .................................... 99-9273

(51) Int. Cl.
*G09G 3/00* (2006.01)
*G09G 5/00* (2006.01)

(52) U.S. Cl. .................... 455/566; 455/556.2; 345/173
(58) Field of Classification Search ................ 455/566, 455/556, 575, 566.1, 414.4; 345/173–174, 345/178–179; 382/186
See application file for complete search history.

(56) References Cited

U.S. PATENT DOCUMENTS

| | | | | |
|---|---|---|---|---|
| 5,389,745 A * | 2/1995 | Sakamoto | ................ | 178/18.03 |
| 5,404,548 A | 4/1995 | Nishioka | .................... | 395/275 |
| 5,698,822 A * | 12/1997 | Haneda et al. | ........... | 178/18.01 |
| 5,838,302 A * | 11/1998 | Kuriyama et al. | .......... | 345/173 |
| 5,991,441 A * | 11/1999 | Jourjine | ....................... | 382/187 |
| 6,091,031 A * | 7/2000 | Lee et al. | ................ | 178/18.01 |
| 6,243,578 B1 * | 6/2001 | Koike | ........................ | 455/557 |
| 6,252,563 B1 * | 6/2001 | Tada et al. | .................... | 345/1.1 |
| 6,278,445 B1 * | 8/2001 | Tanaka et al. | .............. | 345/178 |
| 6,295,372 B1 * | 9/2001 | Hawkins et al. | ............ | 382/187 |
| 6,567,552 B1 * | 5/2003 | Sakaguchi et al. | .......... | 382/225 |
| 6,738,514 B1 * | 5/2004 | Shin et al. | .................. | 382/187 |

FOREIGN PATENT DOCUMENTS

| | | |
|---|---|---|
| EP | 0738951 A1 | 10/1996 |
| EP | 0762265 A2 | 3/1997 |
| EP | 0762265 A2 | 3/1997 |
| EP | 0961454 A2 * | 12/1999 |
| WO | WO 95/25326 | 9/1995 |
| WO | WO 98/53389 | 11/1998 |

* cited by examiner

*Primary Examiner*—William Trost
*Assistant Examiner*—Brandon J. Miller
(74) *Attorney, Agent, or Firm*—Cha & Reiter, LLC

(57) ABSTRACT

Disclosed is a method of inputting and processing a variety of user information for a digital mobile station including a touch screen panel and a control module for processing touch screen panel data generated from the touch screen panel comprising the steps of: (a) continuously counting a predetermined time period interval in response to a written memo input mode; (b) detecting touch screen panel data generated from the touch screen panel corresponding to the continuous counting of the predetermined time period, producing and storing an associated written memo corresponding to the detected touch screen panel data; and, (c) determining whether there is detection of another touch screen panel data generated according to the continuous counting operation for the predetermined time period after the lapse of a certain period of time if there is no detection of the touch screen panel data for the predetermined period of time, storing detected another touch screen panel data if it is determined that there is detection of another touch screen panel data, and then repeating step (a).

19 Claims, 3 Drawing Sheets

METHOD OF PROCESSING USER INFORMATION INPUTTED THROUGH TOUCH SCREEN PANEL OF DIGITAL MOBILE STATION

CLAIM OF PRIORITY

This application makes reference to, incorporates the same herein, and claims all benefits accruing under 35 U.S.C. Section 119 from an application for METHOD OF PROCESSING USER INFORMATION INPUTTED THROUGH TOUCH SCREEN PANEL OF DIGITAL MOBILE STATION filed earlier in the Korean Industrial Property Office on Mar. 18, 1999 and there duly assigned Ser. No. 9273/1999.

BACKGROUND OF THE INVENTION

1. Field of the Invention

The present invention relates to a method of processing user information inputted in a digital mobile station, and more particularly to a method of inputting and processing a variety of user information, such as a written memo, which can be inputted through a touch screen panel (TSP) in the digital mobile station.

2. Description of the Related Art

Currently, as the use of a digital mobile station (also called "digital portable terminal") is becoming popular and the technological development of the digital mobile station follows a trend toward higher-performance as an information processing apparatus, several methods for processing the user information inputted by the user have been proposed and implemented. These methods are proposed to enable a user to easily use several useful features implemented in the digital mobile station, including a phone-book function, a short message-drawing function, an electronic pocketbook function, etc. One feature allows the necessary user information to be inputted through a key input section, i.e., a key panel of the digital mobile station. Another feature allows the recognition of the user's voice as a means to input the user information in the digital mobile station. However, these features have a limitation in that they do not provide an alternate way of inputting and retrieving a different style of characters and numeric values. The predetermined style of information (for example, the given of characters and numerals provided in the mobile phone) previously stored in the memory of the digital mobile station is read out, processed, and displayed only in the form of uniform type characters and numerals. That is, the current system does not allow the user to input stylized information or graphical information other than the predetermined style set by the vendors.

As the conventional user information-inputting or processing methods implemented in the ever so popular digital mobile station do not allow diverse types of user information to be inputted and processed, there is a need for inputting and processing a personalized style of user information, such as stylized characters or graphical information inputted by a different user of the digital mobile station.

SUMMARY OF THE INVENTION

The present invention has been made in an effort to solve the problems occurring in the prior art, and therefore, the object of the present invention is to provide a method of inputting and processing a variety of stylized user information including the personalized writing information or the graphical information provided by the user.

It is another object of the invention to provide a method of processing a variety of personalized user information inputted through a touch screen panel (TSP) by providing the touch screen panel as object-oriented user-information input means in the digital mobile station.

It is still another object of the invention to provide a method of processing a variety of personalized user information such as a hand-written memo inputted through the touch screen panel, while performing the normal function associated with the digital mobile station as a means of communication.

It is still another object of the invention to provide a method of inputting and processing a variety of personalized user information dictated by the user, while overcoming the limited implementation environment, i.e., a limitation in the capacity of the information storing memory of the digital mobile station and a limitation in the information processing performance of a main control module thereof.

In order to achieve the above object according to the present invention, there is provided a method of inputting and processing a variety of personalized user information for a digital mobile station of the type having a touch screen panel and a control module for processing the data generated from the touch screen panel, the method comprising the steps of: counting continuously a predetermined time period in response to a written memo input mode; detecting the touch screen panel data generated from the touch screen panel corresponding to the continuous counting of the predetermined period of time, and producing and storing an associated written memo corresponding to the detected touch screen panel data; and, determining whether there is a detection of another touch screen panel data generated according to the continuous counting operation after the expiration of the predetermined time period, and storing the other detected touch screen panel data if it is determined that there is detection of another touch screen panel data, then repeating the step of counting the predetermined time period.

According to another aspect of the present invention, there is also provided a method of inputting and processing a variety of user information for a digital mobile station including a touch screen panel and a control module for processing the touch screen panel data generated from the touch screen panel comprising the steps of:

(a) setting an operation mode to a written memo input mode;

(b) determining whether a predetermined time period has lapsed in response to the written memo input mode;

(c) determining whether the touch screen panel data is generated if the predetermined time period has lapsed;

(d) determining whether the generated touch screen panel data within the predetermined time period is a continuous line;

(e) if the generated touch screen panel data within the predetermined time period is a continuous line, displaying the generated touch screen panel data within the predetermined time period in a display unit of the mobile station; and, (f) if the generated touch screen panel data within the predetermined time period is not a continuous line, displaying the generated touch screen panel data within the predetermined time period in a display unit of the mobile station.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
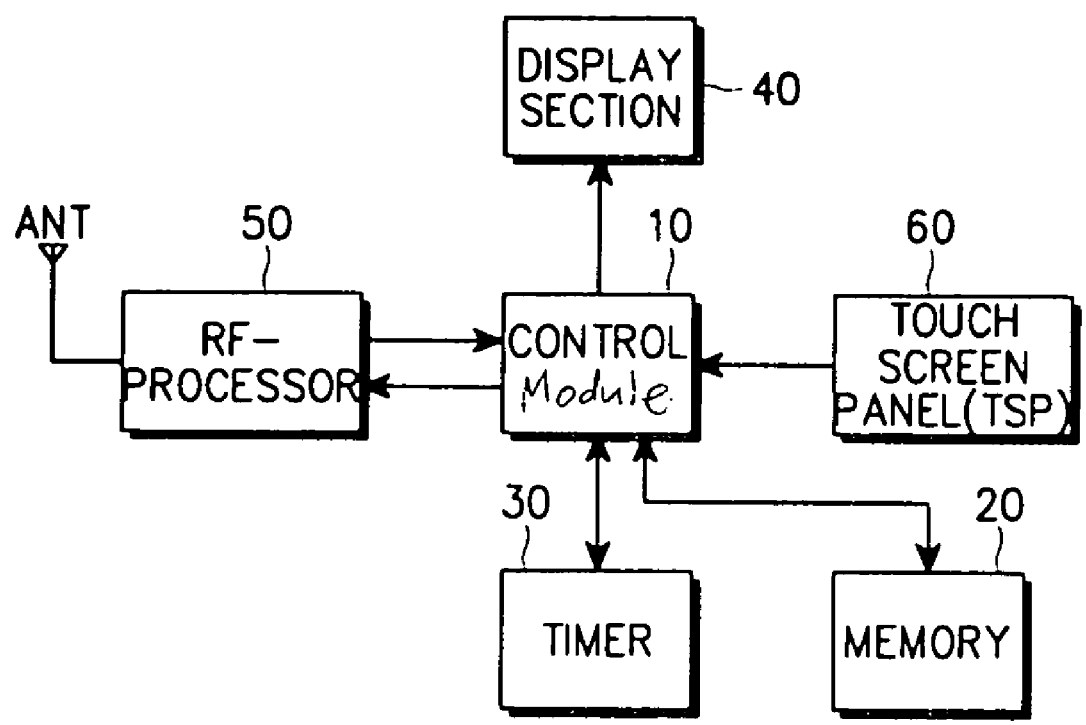
FIG. 1 is a schematic block diagram illustrating the construction of a digital mobile station for processing a variety of user information inputted through a touch screen panel according to the preferred embodiment of the present invention.

A reference will now be made in greater detail to the preferred embodiments of the present invention. In the drawings, the same or similar elements are denoted by the same reference numerals even though they are depicted in different drawings. In the following description of the present invention, numerous specific details, such as a concrete circuit constituting elements, are set forth to provide a more thorough understanding of the present invention. It will be apparent, however, to those skilled in the art that the invention may be practiced otherwise than according to the previously mentioned specific details. For the purpose of clarity, well-known functions and configurations incorporated herein will be omitted as they may make the subject matter of the present invention rather unclear.

FIG. 1 is a schematic block diagram illustrating the construction of a digital mobile station for processing a variety of user information inputted through a touch screen panel applied thereto in accordance with the preferred embodiment of the present invention.

Referring to FIG. 1, a digital mobile station of the present invention comprises a touch screen panel 60 used as a means of inputting an object-oriented user information in a typical digital mobile station and a control module 10 for processing the data generated from the touch screen panel. The touch screen panel 60 employed in the present invention is well known in the art. In the construction of the digital mobile station of FIG. 1, the essential elements of a typical mobile station, such as a dual tone multi-frequency (DTMF) section, a vocoder, etc., are not directly related to the subject matter of the present invention, thus a detailed explanation thereof will be omitted. However, the omitted elements are needed in performing the digital mobile station of the present invention.

Now, the construction and the operation of the digital mobile station to which the present invention is applied will be described in detail hereinafter with reference to FIG. 1.

The control module 10 controls the overall operation of the digital mobile station. The control module 10 recognizes the data applied through the touch screen panel 60 and executes the associated processing operation according to the generated touch screen data in the present invention. The control module 10 is typically implemented by a one-chip microprocessor. According to the present invention, the digital mobile station employs "Mobile Station Modem (MSM)" as the control module 10, which is commercially available in the market and manufactured by Qualcomm Co., located in the Unites States of America. However, it should be understood that the control module manufactured by a different vendor may be applied to the digital mobile station of the present invention. The control module 10 recognizes the data inputted through the touch screen panel 60 and performs the operation of reading the associated coordinate value corresponding to a point where the touch screen panel data is activated. The read coordinate value determines the position where the inputted user information can be displayed on a display section 40. The touch screen panel 60 is disposed on top of the display section 40. The touch screen panel 60, which is a means of inputting n object-oriented user information, generates the data corresponding to the depression of a certain region of the screen by a finger tip or a writing tool and feeds the generated data to the control module 10. A typical key panel or key input section of the mobile station generates the data corresponding to the keying-in or the depression of an associated key provided in the key panel, whereas the touch screen panel 60 generates the data according to the pressure exerted on the screen by the user and the associated coordinate value corresponding to the location where the pressure is exerted. Accordingly, the key panel generates the data only in the form of a predetermined style, but the touch screen panel 60 can generate a variety of personalized touch screen data responsive to the associated points where the data is activated by the finger pressure or the writing tool.

A memory 20 includes a volatile memory (i.e., RAM) and a non-volatile memory (i.e., flash memory, EEPROM). The memory 20 stores a program for controlling the overall operation of the digital mobile station, the initial service data, the operation program for processing the touch screen data generated from the touch screen panel 60 which are applied to the control module 10, and the data is produced according to the performance of the operation program according to the embodiment of the present invention. The memory 20 also performs the buffer function for temporarily storing the processed data and the necessary data. Particularly, the memory 20 stores the written memo inputted through the touch screen panel 60 as user information in the embodiment of the present invention. The type and the size of the stored written memo data depend on the capacity of the memory imbedded in the digital mobile station and the processing capability of the control module 10.

Figure 3A:
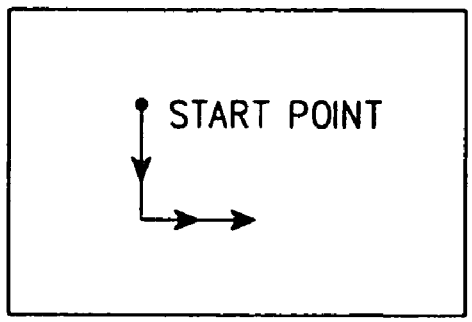
Figure 3B:
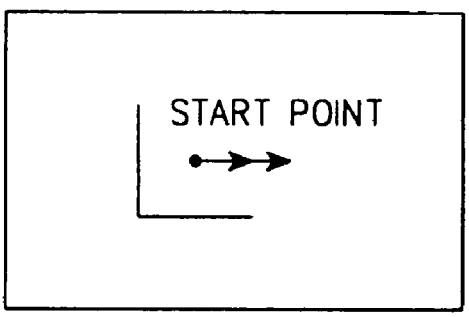
Figure 3C:
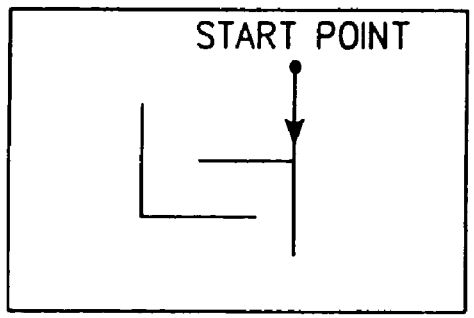

A display section 40 is a user interface device for displaying the whole state of the digital mobile station and the user information inputted through the touch screen panel 60 so that the user can visually identify them. The display section 40 is typically implemented using a liquid crystal display (LCD) under the control of the control module 10. In the embodiment of the present invention, the user input information displayed on the display section 40 under the control of the control module 10 may be from the user input information inputted through the touch screen panel 60 as well as the information inputted through a key board of the mobile station. Accordingly, the display section 40 can display the written memo or the graphical information inputted by the user's hand pressure. As an illustrative example, a different screen display state of the display section 40, according to a preferred embodiment of the present invention, is shown in FIGS. 3a to 3c.

An RF (radio signal) processing section 50 performs the overall processing of the transmission and the reception of the radio signals between the digital mobile station and the base station. During the reception mode, the RF processing section 50 converts an input audio signal of a radio frequency band into an intermediate frequency (IF) signal, converts the IF signal into a baseband signal, and then converts the baseband signal into a digital signal. During the transmission mode, the RF processing section 50 performs the reverse operation of the above-described steps.

A timer 30 performs the counting of a predetermined time period under the control of the control module 10. In the embodiment of the present invention, a suitable time period required for processing the data generated from the touch screen panel 60 is determined so that the basic function of the digital mobile phone is not interrupted. That is, the control module 10 uses a fixed period of time and performs several functions in a time division manner including the touch screen operation. Thus, the predetermined time period according to the present invention refers to the amount of time separately assigned to recognize and process the data applied from the touch screen panel 60 so that the performance of other functions by the control module 10 does not interfere with the embodiment of the present invention. The selected predetermined time may be viewed as a sampling time of the data generated by the touch screen panel 60 to be processed by the control module 10.

In describing the operation of the timer 30, the timer 30 repeatedly counts the predetermined time period set by the above standard, and the touch screen data generated from the touch screen panel 60 within the predetermined time interval is applied to the control module 10, and the control module processes the generated touch panel data at every predetermined time period interval. This type of data recognizing method may be referred to as a polling method. Thus, the control module 10 recognizes and processes the touch screen data generated from the touch screen panel 60 at an increment of the predetermined time period.

As mentioned above, the predetermined time period is determined according to an inherent characteristic of the control module 10. In the case where the embodiment of the present invention is implemented by the MSM, the predetermined period of time will be determined to 20 msec or so. As the CDMA technology operates in the predetermined period of 20 msec, the present invention incorporates the 20 msec as a minimum amount of time period in which other functions performed in the MSM will not interfered with the operation of the touch panel data mode. That is, if the communication signal transmission is performed at a given interval of 20 msec, the present invention employs a predetermined period of 20 msec at a different time slot than the communication signal transmission mode so that the respective operations do not interfere with each other. Thus, the MSM processor operates different functions in a time division manner at an interval of 20 msec.

Figure 2:
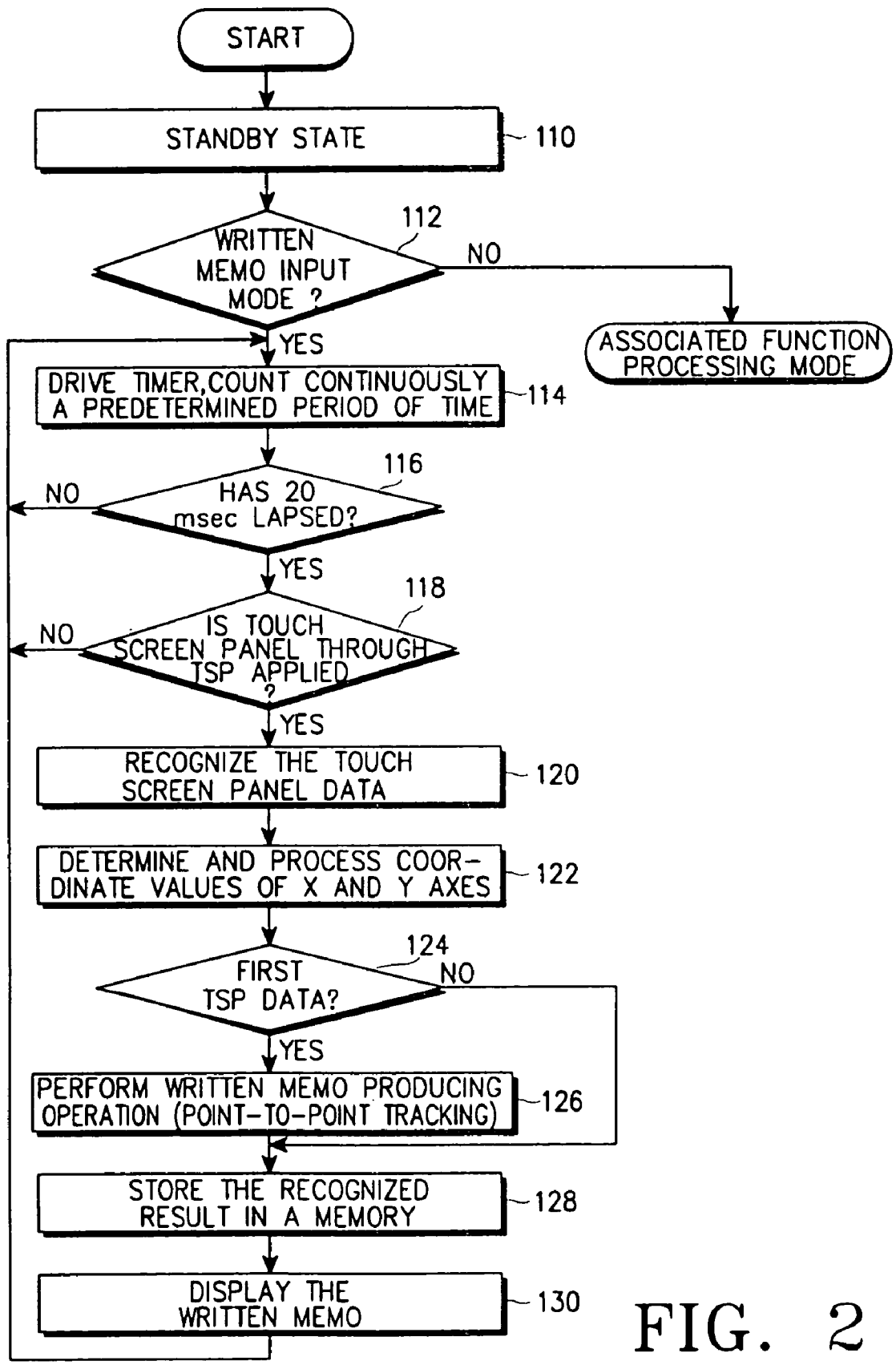
FIG. 2 is a flowchart illustrating the process of implementing the processing operation of a written memo as user information inputted through the touch screen panel for the digital mobile station according to the preferred embodiment of the present invention; and, FIG. 3 is a schematic view illustrating the screen displaying states of the touch screen panel of the digital mobile station according to the preferred embodiment of the present invention.

FIG. 2 is a flowchart illustrating the process of implementing the processing operation of a written memo as user information inputted through the touch screen panel for the digital mobile station according to the preferred embodiment of the present invention.

Referring to FIG. 2, the inputting and processing of user information according to a preferred embodiment of the present invention will be explained in detail.

First, at step 110, the digital mobile station is in a standby state. At this point, the digital mobile station is in the standby mode for an incoming call and in an operation standby mode for other functions. It is determined at subsequent step 112 whether the operation mode is set to a written memo input mode according to the embodiment of the present invention. The initialization of the written memo mode may be activated through the keying-in operation of a typical key board provided in the mobile phone, the voice recognition operation, or the touch screen panel 60 operation. If it is determined at step 112 that the operation mode is set to the written memo input mode, the program proceeds to step 114 in which the control module 10 activates the timer 30. Then, the timer 30 repeatedly performs the counting of a predetermined time period.

In subsequent step 116, it is determined whether the predetermined time period of 20 msec as set forth by the standard of the MSM according to the embodiment of the present invention has lapsed. If it is determined in step 116 that the 20 msec has lapsed, the program proceeds to step 118 where the control module 10 proceeds to determine whether the user has inputted the user information through the touch screen panel 60. If it is determined in step 118 that the touch screen panel data is applied through the touch screen panel 60, the program proceeds to step 120 where the control module 10 performs the recognizing operation of the touch screen data. This recognizing operation determines the type of touch screen data inputted through the touch screen panel (TSP) 60.

Then, in step 122, the control module 10 determines the coordinate values of X and Y axes on the screen of the touch screen panel 60 based on the applied touch screen data, and processes the determined coordinate values accordingly. Subsequently, at step 124, it is determined whether the applied touch screen data generated within the predetermined time period is one continuous line generated from the initial contact point of the touch screen panel at the beginning of the predetermined time period of 20 msec. This determination will be explained through the display states as shown in FIGS. 3a to 3c.

In the case where the user inputs a desired character "네" starting from a start point as shown in FIG. 3a, the touch screen data generated starting from the initial touch start point is continuously detected within the predetermined time period of 20 msec. The purpose of the determination in step 124 is to distinguish the touch screen data generated without a break or with a break within the predetermined time period of 20 msec. The determination is necessary for a written-memo producing operation implemented in the embodiment of the present invention which requires the processing of one continuous line at an increment of the predetermined period of 20 msec.

That is, the written-memo producing operation is not necessary for the user information data inputted initially, i.e. the touch screen panel data generated at the input of the start point. However, the touch screen panel data generated according to the input of a continuous line following the input of the start point should be processed as one line representing the user information. In other words, as can be seen from FIGS. 3a to 3c, the touch screen panel data generated according to the input of the start point is processed at every 20 msec interval after determining whether the touch screen panel data is generated and after recognizing a coordinate value of the touch screen panel data. However, if the user information following the input of the start point and generated within the 20 msec is not a continuous line, a different data processing operation should be performed. As the control module 10 in the embodiment of the present invention performs the recognition of the touch screen panel data at an interval of the predetermined period of 20 msec, the touch screen panel data is generated as a continuous line only if each generated touch data within the 20 msec does not have a break. For reference, this operation is called a point-to-point tracking method in which several points form a line in such a manner that when there is a point and another point, the points are connected by a line.

The present invention employs a method which produces a continuous line through the generated touch screen data that is sensed every 20 msec. Whether the method is implemented depends on the determination operation in the step 124. Accordingly, if it is determined in step 124 that the applied touch screen panel data is not a continuous data generated within the predetermined period of 20 msec, the program proceeds to step 128 where the control module 10 allows the recognized result to be stored in a buffer of the memory 20 as a new starting point. If, on the other hand, it is determined in step 124 that the applied touch screen panel data is a continuous screen panel data within the predetermined period of 20 msec, the program proceeds to step 126 where the control module 10 performs the point-to-point operation by connecting the line generated within the current predetermined period to the previous line generated in the previous predetermined period, then allows the result according to the performance of the written memo producing operation to be stored in the buffer of the memory 20. At subsequent step 130, the recognized result data stored in the step 128 is displayed on a screen of the display section 40.

FIG. 3 is a schematic view illustrating a screen displaying the transition state of the touch screen panel of the digital mobile station generating a stylized character inputted by a user according to a preferred embodiment of the present invention.

Referring to FIG. 3, there is shown three transition states where a user inputs a Korean alphabet character "버" as the user information through the touch screen panel 60, and the inputting and the processing the user information are performed through the states of FIG. 3a, FIG. 3b, and FIG. 3c, respectively. These inputting and processing operations are carried out according to the process routine of FIG. 2, previously mentioned.

As described above, the inputted user information processing method of the present invention has the advantage of inputting and processing personalized and graphical information drawn by a user according to the user's preference in the digital mobile station. In addition, a user can input and process diverse information dictated by the user through the touch screen panel as another means of user information-input in the digital mobile station. Moreover, if an incoming call is received during the operation of generating the touch screen data, the process can be temporally stopped and generated touch screen data can be stored temporally so that the user can receive the incoming call. After completing the incoming call, the user can resume the generating of the touch screen data. As the operation of the generating and storing the touch screen data is performed at a different time slot than the communication operation time slot in the MSM processor, the present invention enables the inputting and processing of diverse information including the personalized written information, and the graphical or picture information in the digital mobile station, thereby providing more convenient feature to the user.

While this invention has been described in connection with what is presently considered the most practical and preferred embodiment, it is to be understood that the invention is not limited to the disclosed embodiment; on the contrary, it is intended to cover various modifications within the spirit and scope of the appended claims.

What is claimed is:

1. A method of inputting and processing a variety of user information for a digital mobile station, which includes a touch screen panel and a control module for processing touch screen data generated from the touch screen panel, the method comprising the steps of:
    (a) starting a counter having a predetermined time period in response to the digital mobile station entering a write input mode;
    (b) continuously detecting the touch screen data generated from the touch screen panel was input per the predetermined time period;
    (c) displaying and storing the touch screen data generated within the predetermined time period as a continuous line during the write input mode;
    (d) determining whether a next touch screen data is generated from the touch screen panel within a next predetermined time period; and,
    (e) if the next touch screen data is detected within the next predetermined time period, displaying and storing the next touch screen data.

2. The method according to claim 1, wherein the method further comprises the step of connecting the touch screen data with the next touch screen data as a continuous line.

3. The method according to claim 1, wherein the predetermined time period is determined so that processing the touch screen data generated from the touch screen panel does not interfere with another predetermined time period assigned to the control module.

4. The method according to claim 3, wherein the predetermined time period is set at one time slot in the control module and the another time period is set at another time slot in the control module.

5. The method according to claim 4, wherein the predetermined time period defines a time period that is required for sampling the touch screen data.

6. The method according to claim 5, wherein the predetermined time period set by a manufacturer of the control module.

7. A method of inputting and processing a variety of user information for a digital mobile station, which includes a touch screen panel and a control module for processing touch screen data generated from the touch screen panel, the method comprising the steps of:
    (a) setting the mobile station in a write input mode;
    (b) determining whether a predetermined periodic period of time has lapsed;
    (c) continuously determining whether the touch screen data is generated after the expiration of the periodic time period during the write input mode;
    (d) determining whether the generated touch screen data within the periodic time period is one continuous line;
    (e) if the generated touch data is one continuous line within the periodic time period, displaying and storing the generated touch screen data in a display unit and a buffer of the mobile station, respectively; and,
    (f) if the generated touch data is not one continuous line within the periodic time period, displaying and storing the generated touch screen data as a new starting line in the display unit and the buffer of the mobile station, respectively.

8. The method according to claim 7, wherein the method further comprising the step of detecting a next touch screen data generated within the periodic time period and repeating the steps (d), (e), and (f).

9. The method according to claim 8, wherein the periodic time period is determined so that the processing the touch screen data generated from the touch screen panel does not interfere with another predetermined time period assigned to the control module.

10. The method according to claim 9, wherein the periodic time period is set at one time slot in the control module and the another time period is set at another time slot in the control module.

11. A method of processing user information inputted through a touch screen panel for a digital mobile station, comprising the steps of:
   (a) continuously detecting a series of touch screen data generated from the touch screen panel per a predetermined time period while the digital mobile station is in a write input mode; and,
   (b) displaying the generated touch screen data in a display unit of the mobile by connecting a series of the touch screen data generated at the periodic time period interval if the touch screen data generated at the periodic time period interval is a continuous line.

12. The method according to claim 11, wherein the periodic time period is determined so that processing the touch screen data generated from the touch screen panel does not interfere with another predetermined time period assigned to the control module.

13. The method according to claim 12, wherein the periodic time period is set at one time slot and the another time period is set at another time slot in a processor of the mobile phone.

14. The method according to claim 13, wherein the periodic time period defines a time period that is required for sampling the touch screen data.

15. The method according to claim 14, wherein the periodic time period set by a manufacturer of the control module.

16. A digital mobile station having a touch screen panel as an input means, comprising:
   a timer for performing the counting of a predetermined time interval in response to a timer control signal corresponding to an entry of a write input mode;
   a detector for continuously detecting a touch screen panel data generated during the predetermined time interval during the write input mode;
   a display unit for displaying the detected touch screen panel data as a continuous line;
   a memory for storing the detected touch screen panel data; and
   a control module for generating the timer control signal, determining whether another touch screen panel data is detected corresponding to a next predetermined time interval, generating a control signal for displaying the detected touch screen panel data on the display unit, and generating a control signal for storing the detected touch screen panel data in the memory.

17. A digital mobile station having a touch screen panel as an input means, comprising:
   a timer for repeatedly counting a predetermined time interval in response to a write input mode;
   a detector for continuously detecting a touch screen panel data generated during the time interval during the write input mode;
   a display unit for displaying the detected touch screen panel data as a continuous line;
   a memory for storing the detected touch screen panel data; and
   a control module for determining whether the detected touch screen panel data is generating after the expiration of the predetermined time interval, and if the detected touch screen panel data is one continuous line within the predetermined time interval, respectively generating control signals for displaying the detected touch screen panel data on the display unit and storing the detected touch screen panel data in the memory, and if the detected touch screen panel data is not one continuous line within the predetermined time interval, respectively generating control signals for displaying the detected touch screen panel data as start of a new line on the display unit and storing the detected touch screen panel data.

18. A digital mobile station having a touch screen panel as an input means, comprising:
   a timer for repeatedly counting about a predetermined time interval in response to a write input mode;
   a detector for continuously detecting a touch screen panel data generated during the predetermined time interval during the write input mode;
   a display unit for displaying the detected touch screen panel data;
   a memory for storing the detected touch screen panel data; and
   a control module for generating a control signal for repeatedly detecting a series of a touch screen data generated from a touch screen panel during an interval of a predetermined time interval while the digital mobile station is in a write input mode, and generating a control signal for displaying the detected touch screen data on a display unit by connecting the series of the touch screen data if the series of the touch screen data detected during the predetermined time interval is one continuous line.

19. The digital mobile station according to claim 18, wherein the touch screen panel generates the touch screen panel data corresponding to a depression of a certain region of the touch screen panel by a finger tip or a writing tool.

* * * * *